United States Patent Office 3,402,162
Patented Sept. 17, 1968

3,402,162
POLYMERS OF ORGANOLITHIUM-INITIATED CONJUGATED DIENES TREATED WITH VINYL SUBSTITUTED HETEROCYCLIC NITROGEN COMPOUNDS
Charles W. Strobel, Borger, Tex., assignor to Phillips Petroleum Company, a corporation of Delaware
No Drawing. Filed June 18, 1964, Ser. No. 376,234
9 Claims. (Cl. 260—94.2)

ABSTRACT OF THE DISCLOSURE

In the process of preparing polymers of conjugated diolefins having low tendency to cold flow with organolithium initiators, the addition of a vinyl substituted heterocyclic nitrogen compound at the completion of polymerization.

---

This invention relates to an improved method of polymerizing a conjugated diene with an organolithium initiator and to the product thus produced. In another aspect, the invention relates to a method of terminating the polymerization of a conjugated diene in order to produce a rubbery product having low tendency to cold flow.

Valuable rubbery products providing a wide selection of physical properties favorable for many uses can be formed by polymerizing conjugated dienes alone or with copolymerizable monomers using an organolithium polymerization initiator. These processes preferably use a hydrocarbon medium and the reaction is usually terminated or shortstopped when the conversion has reached the desired level by adding to the polymerization mixture an inactivating agent such as water, alcohol or organic acid. The rubbery polymers are then precipitated and recovered.

These polymers frequently have a strong tendency to cold flow in the unvulcanized state, particularly when formed from butadiene or isoprene. A number of methods have been suggested for altering the polymerization process or using certain terminating agents in order to solve this cold flow problem. One difficulty has been, however, that the properties of the product can be changed significantly through the use of such precautions. Also, the terminating agents are frequently expensive compounds which are not readily available. Introducing compounds which substantially change the character of the polymer or the nature of the polymerization can further be undesirable since the presence of such compounds must be isolated to a limited phase of the over-all reaction and other process streams, particularly recycle material, must be kept free of such agents. It is highly desirable, therefore, that a method of reducing cold flow of these polymers be found which uses readily available and compatible compounds in small amounts.

I have discovered that the cold flow of rubbery polymers formed by polymerizing or copolymerizing conjugated dienes alone or with each other or in admixture with minor amounts of copolymerizable vinyl-substituted aromatic compounds such as styrene in the presence of an organolithium polymerization initiator and in a hydrocarbon diluent can be substantially reduced by adding to the polymerization mixture, after completion of the polymerization but prior to quenching the reaction, a small amount of a vinyl-substituted heterocyclic nitrogen compound which is a vinylpyridine, vinylquinoline or vinylisoquinoline compound as subsequently described.

The amount of this heterocyclic nitrogen compound which is used does not exceed 3 parts by weight per 100 parts of monomer. The effect of the heterocyclic nitrogen compound on the physical properties of the vulcanized polymer is quite small and for most purposes can be disregarded. In order to achieve the desired reduction of cold flow in the uncured stock, the amount of heterocyclic nitrogen compound is in the range of 2 to 20 gram moles per gram atom of lithium in the initiator. In this way the cold flow of the polymer is greatly reduced and can be completely eliminated without significantly altering the processing character of the polymer or the ultimate physical properties of the cured rubber. Raw rubber thus formed can be handled quite easily and stored for long periods in the form of bales wrapped only in plastic film. Without the treatment to reduce cold flow the rubber seeps from a package of this type and the bales stick together. The product is readily processable and can be compounded and cured in the conventional manner. The rubber has the broad utility normally associated with rubbers of this type, particularly in the automobile tire industry for use as tire treads.

It is an object of my invention to provide a method of polymerizing a conjugated diene with an organolithium initiator in order to provide a rubbery product having a low tendency to cold flow. Another object of my invention is to provide a rubbery polymer of a conjugated diene, particularly 1,3-butadiene, which has good processing characteristics, can be compounded and cured in the conventional manner, but has very little tendency to cold flow in the unvulcanized state. Another object is to provide an improved method of terminating an otherwise conventional organolithium polymerization of a conjugated diene in order that the product which is recovered has a low tendency to cold flow. Other objects, advantages and features of my invention will be apparent to those skilled in the art from the following description.

While this invention is directed to the polymerization of conjugated dienes broadly, it is of special importance in connection with the polymerization of 1,3-butadiene and of isoprene, either alone to form homopolymers or copolymerized with styrene. Other conjugated dienes can be employed, however, for example such dienes containing from 4 to 8 carbon atoms per molecule such as piperylene, 1,3-hexadiene, 1,3-octadiene, and the like. These can be copolymerized with other vinyl-substituted aromatic compounds such as 1-vinylnaphthalene, 2-vinylnaphthalene, 3-methylstyrene, and the like. The present invention can be applied to copolymerization reactions which form either block or random copolymers, although it is of greater importance in connection with the formation of random copolymers which tend to have a greater cold flow problem. As is well known, random copolymers of this type can be prepared by using as the polymerization diluent a mixture of the hydrocarbon and a polar material such as ether, thioether or tertiary amine.

Any organolithium polymerization initiator can be used. Ordinarily the initiators which are employed in this type of polymerization can be represented by the formula $RLi_x$ where $x$ is an integer of 1 to 4 and R is an aliphatic, cycloaliphatic, or aromatic radical having up to about 30 carbon atoms. It is highly preferred, however, to practice the present invention with those initiators of the type described in which $n$ is 1 and R is a lower alkyl having 2 to 6 carbon atoms. Examples of such preferred initiators include ethyllithium, n-butyllithium, n-amyllithium, and the like.

The polymerization reactions are carried out over a broad temperature range, for example from —100 to 300° F., preferably 0 to 175° F., and the pressure is sufficient to maintain the monomer and diluent substantially in the liquid phase. The diluent used is preferably a hydrocarbon, which can be aromatic, paraffinic or cycloparaffinic in character. Examples include isobutane, n-pentane, n-hexane, isooctane, cyclohexane, benzene, toluene, and the like. Polar materials can be added as described in U.S.

Patent 2,975,160 of Zelinski where it is desired to produce a random copolymer. The amount of initiator which is used in order to prepare a rubbery polymer as desired in the present invention is normally in the range of about 0.5 to 15 milliequivalents of initiator per 100 parts by weight of monomer. More often the amount of initiator will be in the range of about 1 to 5 milliequivalents on the same basis, the number of equivalents per mole of initiator depending upon the number of lithium atoms in each molecule of initiator.

Polymerizations of the type described are very efficient and can be carried out substantially to completion. If desired, the polymerization can be stopped short of a quantitative conversion of monomer to polymer. According to the present invention, whenever it is desired to stop the polymerization the treating agent is added and allowed to react with the active polymer. The mixture should be agitated for a period in the range of 5 minutes to 50 hours or longer, depending upon the temperature. Ordinarily this temperature will be the same as that used for the polymerization. Generally a temperature in the range of 50 to 250° F. is desirable and it is preferred that the temperature be above 75° F.

The heterocyclic nitrogen compound which is used to treat the polymerization mixture is either a vinylpyridine, vinylquinoline, or vinylisoquinoline compound in which the vinyl group is in a position alpha or gamma with respect to the nitrogen. The compound can also contain certain substituents on the aromatic ring. These compounds can be represented by one of the formulas selected from the group consisting of:

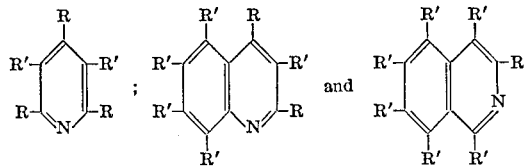

wherein one R is vinyl and each of the other R groups and each R' is selected from the group consisting of hydrogen, alkyl, cycloalkyl, aryl, alkylcycloalkyl, arylcycloalkyl, aralkyl, alkaryl, alkoxy, aryloxy, and tertiary amine, with the provision that when an R group is alkyl it is a tertiary alkyl group, the total of the R and R' groups having a total of not over 14 carbon atoms. As can be seen from the above formulas and the accompanying description, if an alkyl group is present in a position either alpha or gamma with respect to the nitrogen, it must be a tertiary alkyl group. No other restriction is imposed on the possible substituents since they are essentially inert to the process and merely increase the size of the molecule of the treating agent without altering its effectiveness. Examples of compounds which illustrate suitable terminating agents as given above include 2-vinylpyridine, 4-vinylpyridine, 3,5 - diethyl - 4 - vinylpyridine, 5 - methyl-2-vinylpyridine, 5 - n - octyl - 2 - vinylpyridine, 3 - n - dodecyl-2-vinylpyridine, 3,5-di-n-hexyl-4-vinylpyridine, 5-cyclohexyl-2-vinylpyridine, 4-phenyl-2-vinylpyridine, 3,5 - di - tert-butyl-2-vinylpyridine, 3-benzyl-4-vinylpyridine, 6-methoxy-2-vinylpyridine, 4-phenoxy-2-vinylpyridine, 4-dimethylamino-2-vinylpyridine, 3,5-dimethyl-4-diamylamino-2-vinylpyridine, 2-vinylquinoline, 4-vinylquinoline, 2-tert-butyl-4-vinylquinoline, 3-methyl-4-vinylquinoline, 3-cyclohexyl-4-vinylquinoline, 3-methyl-4-ethoxy-2-vinylquinoline, 1-vinylisoquinoline, 3-vinylisoquinoline, 4-tert-dodecyl-1-vinylisoquinoline, 3-dimethylamino - 3 - vinylisoquinoline, 4 - benzyl - 3-vinylisoquinoline, 4-phenyl-1-vinylisoquinoline, and the like.

The amount of treating agent which is used depends upon the quantity of initiator employed but in no case should the amount of agent exceed 3 parts by weight per 100 parts of monomeric material and preferably not over 2 parts by weight of agent are used on the same basis. The ratio of vinyl-substituted heterocyclic nitrogen compound on a molar basis to initiator is in the range of 2 to 20 moles of said compound per gram atom of lithium in the initiator. I have found that polymers having exceptionally good processing properties with substantially no tendency to cold flow can be formed when operating within the more limited range of 3 to 9 moles of vinylpyridine or similar compound per gram atom of lithium in the initiator.

With the addition of the treating agent in the quantity stipulated, polymerization substantially ceases and the polymer is then ready for recovery by conventional methods which most often include alcohol coagulation and steam stripping. The polymer thus recovered is compounded and cured in the manner which is conventional for rubbery polymers of this type. The Mooney value of the polymer can be varied by adjusting the initiator level and correspondingly the amount of vinyl-substituted heterocyclic nitrogen treating agent employed.

In order to illustrate further the advantages of my invention the following examples are presented. The materials, proportions and conditions are typical only and should not be construed to limit my invention unduly.

Example I

Butadiene was polymerized in a series of runs using n-butyllithium as the initiator. The effect of 4-vinylpyridine as a terminating agent was determined. Variable amounts were employed in the several runs. The polymerization recipe was as follows:

1,3-butadiene, parts by weight _____ 100
Cyclohexane, parts by weight _____ 780
n-Butyllithium, millimoles _____ 1.5
Time, hours _____ 4
Temperature, ° F. _____ 122
Conversion, percent _____ Quantitative One run was reserved as a control. 4-vinylpyridine was added to the other runs and the mixtures were agitated for 30 minutes. The temperature was maintained at 122° F. throughout the treating period. The polymers were then coagulated with isopropyl alcohol, separated, 0.5 part by weight per 100 parts rubber of the antioxidant 2,2'-methylene-bis(4-methyl-6-tert-butylphenol) was adder, and the products were dried.

The Mooney value (ML-4 at 212° F.; ASTM D-1646-61), inherent viscosity, gel, and cold flow were determined on the dry polymers. Results are presented in Table I.

TABLE 1

| Run No. | 4-Vinylpyridine | | 4-VP/Li Equivalents | ML-4 at 212° F. | Inh. Visc. | Gel, Percent | Cold Flow, mg./min. |
|---|---|---|---|---|---|---|---|
| | p.h.m. | m.h.m. | | | | | |
| 1 | 0.0 | | | 17.5 | 1.89 | 0 | 37.4 |
| 2 | 0.2 | 1.9 | 1.3/1 | 32 | 2.18 | 0 | 19.5 |
| 3 | 0.4 | 3.8 | 2.5/1 | 48.5 | 2.47 | 0 | 3.8 |
| 4 | 0.8 | 7.6 | 5.0/1 | 69 | 2.73 | 0 | 0.59 |
| 5 | 1.6 | 15.2 | 10.0/1 | 111 | 3.07 | 12 | 0.093 |

In the foregoing table, p.h.m. and m.h.m. represent parts by weight per 100 parts monomer and millimoles per 100 parts monomer, respectively. 4–VP represents 4-vinylpyridine.

These data show that a significant reduction in cold flow was achieved by treatment of the unquenched polymer solution with 4-vinylpyridine.

Example II

Two series of runs were made for the polymerization of butadiene using variable amounts of n-butyllithium as the initiator. In one series of runs 0.8 p.h.m. (7.6 m.h.m.) of 4-vinylpyridine was added to each of the reaction mixtures and in the other series 1.6 p.h.m. (15.2 m.h.m.) of 4-vinylpyridine was used. Polymerization was effected in accordance with the following recipe:

| | |
|---|---|
| 1,3-butadiene, parts by weight | 100 |
| Cyclohexane, parts by weight | 1200 |
| n-Butyllithium, millimoles | Variable |
| Time, hours | 3.5 |
| Temperature, ° F. | 122 |
| Conversion, percent | Quantitative |

At the conclusion of the polymerization 4-vinylpyridine was added to each unquenched reaction mixture and the reactants were agitated for 1.5 hours while the temperature was maintained at 122° F. The polymers were recovered in the manner described in Example I. Results are presented in Table II.

TABLE II

| Run No. | n-BuLi, m.h.m. | 4-Vinylpyridine p.h.m. | 4-Vinylpyridine m.h.m. | 4-VP/Li, Equivalents | ML-4 at 212° F. | Inh. Visc. | Gel, Percent | Cold Flow, mg./min. |
|---|---|---|---|---|---|---|---|---|
| 1 | 1.5 | 0.8 | 7.6 | 5.0/1 | 62.0 | 2.19 | 0 | 0.00 |
| 2 | 1.7 | 0.8 | 7.6 | 4.5/1 | 39.5 | 1.91 | 0 | 0.60 |
| 3 | 1.9 | 0.8 | 7.6 | 4.0/1 | 31.5 | 1.71 | 0 | 0.70 |
| 4 | 2.1 | 0.8 | 7.6 | 3.6/1 | 22.0 | 1.64 | 0 | 3.50 |
| 5 | 1.7 | 1.6 | 15.2 | 8.9/1 | 51.0 | 1.80 | 0 | 0.23 |
| 6 | 1.9 | 1.6 | 15.2 | 8.0/1 | 39.5 | 1.58 | 0 | 0.00 |
| 7 | 2.1 | 1.6 | 15.2 | 7.2/1 | 27.5 | 1.50 | 0 | 1.10 |
| 8 | 2.3 | 1.6 | 15.2 | 6.6/1 | 23.0 | 1.41 | 0 | 2.07 |

These data demonstrate again the substantial reduction in cold flow that can be obtained with vinylpyridine treatment of the unquenched polymerization mixtures. Polymers having a Mooney value below 40 can be prepared that have very low, if any, cold flow, as shown in Runs 2, 3 and 6.

Example III

A large sample of polybutadiene was prepared for evaluation in a tread stock recipe. Polymerization recipe, compounding recipe, and properties are presented in Table III.

TABLE III

Polymerization recipe

| | |
|---|---|
| 1,3-butadiene, parts by weight | 100 |
| Cyclohexane, parts by weight | 860 |
| n-Butyllithium, millimoles | 1.7 |
| Time, hour | 1 |
| Temperature, ° F. | 158 |
| Conversion, percent | Quantitative |
| 4-vinylpyridine, p.h.m. | 0.8 |
| Time, hour | 0.5 |
| Temperature, ° F. | 158 |

Raw rubber properties

| | |
|---|---|
| ML-4 at 212° F. | 31.9 |
| Cold flow, mg./min. | 2.8 |

Compounding recipes, parts by weight

| | |
|---|---|
| Rubber | 100 |
| High abrasion furnace black | 50 |
| Zinc oxide | 3 |
| Stearic acid | 1 |
| Flexamine [1] | 1 |
| Resin 731D [2] | 5 |
| Aromatic oil | 5 |
| Sulfur | 1.75 |
| NOBS Special [3] | 1.1 |

[1] Physical mixture containing 65 percent of a complex diarylamine-ketone reaction product and 35 percent of N,N'-diphenyl-p-phenylenediamine.
[2] Disproportionated pale rosin stable to heat and light.
[3] N-oxydiethylene-2-benzothiazyl sulfenamide.

Processing properties

| | |
|---|---|
| Compounded MS-1½ at 212° F. | 55.5 |
| Extrusion at 250° F.: [1] | |
| Inches/min. | 42 |
| Grams/min. | 92 |
| Rating, Garvey die | 8+ |

[1] Ind. Eng. Chem. 34, 1309 (1942). A No. ½ Royle extruder is used with a Garvey die. The rating is based on 12 for a perfectly formed extruded product, with the lower numbers indicating less nearly perfect products.

Physical properties (30 minutes cure at 307° F.)

| | |
|---|---|
| $\nu \times 10^4$, moles/cc. [1] | 2.45 |
| 300% modulus, p.s.i. [2] | 1900 |
| Tensile, p.s.i. [2] | 2375 |
| Elongation percent [2] | 355 |
| $\Delta T$, ° F. [3] | 44.9 |
| Resilience, percent [4] | 78.3 |
| Shore A hardness [5] | 67 |

[1] Rubber World, 135, 67–73, 254–260 (1956).
[2] ASTM D–412–61T.
[3] ASTM D–623–58
[4] ASTM D–945–59 (modified)—Gerzley oscillograph. Test specimen is a right circular cylinder 0.7 inch in diameter and one inch high.
[5] ASTM D–676–59T. Shore Durometer, Type A.

The above data demonstrate that the product of this invention can be handled and processed in a conventional manner to provide a composition having good physical properties which are especially well suited for the manufacture of automobile tire treads.

Inherent viscosity and gel for the polymers were determined as follows:

One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample (soluble portion).

Determination of gel was made along with the inherent viscosity determination. The wire cage was calibrated for toluene retention in order to correct the weight of swelled gel and to determine accurately the weight of dry gel. The emtpy cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by substratcting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

Cold flow was measured by extruding the rubber through a quarter-inch orifice at a pressure of 3.5 p.s.i. and a temperature of 50° C. (122° F.). After allowing 10 minutes for the extrusion to reach a steady state, the rate of extrusion was measured and the values reported in milligrams per minute.

As will be apparent to those skilled in the art, various modifications can be made in this invention without departing from the spirit or scope thereof.

I claim:

1. In the polymerization of a conjugated diene having 4 to 8 carbon atoms per molecule in the presence of an organolithium initiator to form rubbery polymer having a low tendency to cold flow in the unvulcanized state, the improvement which comprises adding at the end of the polymerization to the active polymerization mixture up to 2 parts by weight per 100 parts of monomer of a vinyl-substituted heterocyclic nitrogen compound having a formula selected from the group consisting of

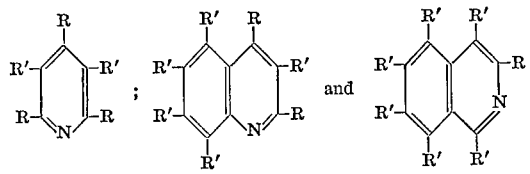

wherein one R is vinyl and each of the other R groups and each R' is selected from the group consisting of hydrogen, alkyl, aryl, cycloalkyl, alkylcycloalkyl, arylcycloalkyl, aralkyl, alkaryl, alkoxy, aryloxy, and tertiary amine, and where R is akyl it is a tertiary alkyl group, the total of said R and R' groups having a maximum of 14 carbon atoms, the ratio of gram moles of said vinyl-substituted heterocyclic nitrogen compound to gram atoms of lithium in said initiator being in the range of 3:1 to 9:1.

2. A method of forming a polymer having a low tendency to cold flow in the unvulcanized state which comprises polymerizing a conjugated diene having 4 to 8 carbon atoms per molecule in a hydrocarbon liquid diluent and in the presence of an organolithium initiator having the formula RLi wherein R is lower alkyl, adding to the polymerization mixture at the completion of the polymerization and prior to quenching the polymerization mixture per 100 parts of monomer charged up to 2 parts by weight of a vinyl-substituted heterocyclic nitrogen compound having a formula selected from the group consisting of

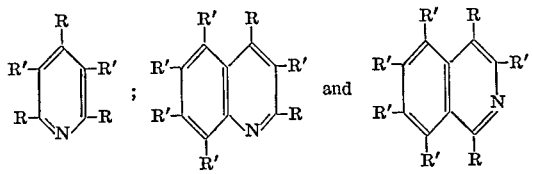

wherein one R is vinyl and each of the other R groups and each R' is selected from the group consisting of hydrogen, alkyl, aryl, cycloalkyl, alkylcycloalkyl, arylcycloalkyl, aralkyl, alkaryl, alkoxy, aryloxy, and tertiary amine, and where R is akyl it is a tertiary alkyl group, the total of said R and R' groups having a maximum of 14 carbon atoms, the ratio of gram moles of said vinyl-substituted heterocyclic nitrogen compound to gram atoms of lithium in said initiator being in the range of 3:1 to 9:1, agitating the resulting mixture for about 5 minutes to 50 hours at a temperature in the range of 50 to 250° F., and recovering a rubbery polymer.

3. A method of forming a polymer having a low tendency to cold flow in the unvulcanized state which comprises polymerizing a conjugated diene having 4 to 8 carbon atoms per molecule in a hydrocarbon liquid diluent and in the presence of an organolithium initiator having the formula RLi wherein R is lower alkyl, adding to the polymerization mixture at the completion of the polymerization and prior to quenching the polymerization mixture per 100 parts of monomer charged up to 2 parts by weight of a vinyl-substituted heterocyclic nitrogen compound having a formula selected from the group consisting of

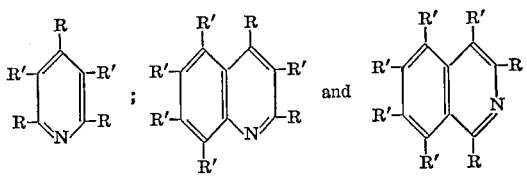

wherein one R is vinyl and each of the other R groups and each R' is selected from the group consisting of hydrogen, alkyl, aryl, cycloalkyl, alkylcycloalkyl, arylcycloalkyl, aralkyl, alkaryl, alkoxy, aryloxy, and tertiary amine, and where R is alkyl it is a tertiary alkyl group, the total of said R and R' groups having a maximum of 14 carbon atoms, the ratio of gram moles of said vinyl-substituted heterocyclic nitrogen compound to gram atoms of lithium in said initiator being in the range of 3:1 to 9:1, agitating the resulting mixture for about 5 minutes to 50 hours at a temperature in the range of 75 to 250° F., and recovering a rubbery polymer.

4. The method of claim 3 wherein said initiator is n-butyllithium and said conjugated diene is 1,3-butadiene.

5. The method of claim 4 wherein said compound is 2-vinylpyridine.

6. The method of claim 4 wherein said compound is 4-vinylpyridine.

7. The method of claim 4 wherein said compound is 5-methyl-2-vinylpyridine.

8. The method of claim 4 wherein said compound is 2-vinylquinoline.

9. The method of claim 4 wherein said compound is 1-vinylquinoline.

References Cited

UNITED STATES PATENTS 3,109,871   11/1963   Zelinski et al. _____ 260—94.217
3,177,190    4/1965   Hsieh _____ 260—94.217

JOSEPH L. SCHOFER, *Primary Examiner.*

H. WONG, *Assistant Examiner.*